UNITED STATES PATENT OFFICE.

T. BELL AND H. SCHOLEFIELD, OF SOUTH SHIELDS, ENGLAND.

IMPROVEMENT IN THE MANUFACTURE OF BORAX FROM NATIVE BORATE OF LIME.

Specification forming part of Letters Patent No. 13,633, dated October 9, 1855.

*To all whom it may concern:*

Be it known that we, THOMAS BELL, of Don Alkali Works, South Shields, and HENRY SCHOLEFIELD, also of South Shields, England, subjects of the Queen of Great Britain, have invented or discovered a new and useful Improvement in the Manufacture of Borax; and we, the said THOMAS BELL and HENRY SCHOLEFIELD, do hereby declare the nature of the invention and the manner in which the same is to be performed are fully described and ascertained in and by the following statement—that is to say:

This invention has for its object the employment of borate of lime (which is a natural product now brought from South America, and may probably hereafter be discovered in other parts of the world) in the manufacture of borax. This product does not consist simply of boracic acid and lime; but it is believed to be generally combined with other matters or impurities.

In the manufacture of borax the ordinary process has been to mix boracic acid of commerce with a boiling solution of carbonate of soda, and after the boiling has been conducted for a suitable time the solution has been suffered to stand for some ten or twelve hours, or until the foreign matters have been deposited. The supernatant liquor was next withdrawn and conducted or introduced into crystallizing-pans, out of which, after crystallization has taken place, the mother-liquor has been suffered to escape so as to enable the impure crystals of borax to be removed and subjected to expensive refining processes in order to convert them into larger or marketable crystals. This process necessarily involves the cost and employment of boracic acid in the state in which it is usually sold in commerce. Its manufacture is carried on in Italy at considerable expense, at what are termed the "Boracic Lagoons."

In carrying out our invention or process we do not employ boracic acid in the state in which it is sold in the market; but we obtain from it the borate of lime, and without subjecting it to the process of crystallization, and while it is in solution we combine carbonate of soda with it and boil the mixture, purify it, and crystallize out the borate of soda. This process not only effects a great saving in expense, but also in time, in the manufacture of borax, as it saves all the ordinary processes attendant upon procuring the boracic acid in a solid state. Besides this, it enables a hitherto comparatively useless mineral—*videlicit*, borate of lime—to be employed in the manufacture of borax to great advantage.

Having thus stated the nature of our invention, we will proceed to describe the manner of performing the same.

We take by preference at the rate of about five hundred pounds of the mineral borate of lime in a powdered state, and we boil it in as much water as will cover it, adding by degrees about one hundred and forty-five pounds of the oil of vitriol of commerce, and the boiling is continued for about an hour. The liquor thus obtained is then allowed to stand to settle, and the clear liquor is drawn off; or the liquor may be filtered. The residue is to be washed and clear liquor mixed with the previous liquor, and in this state the liquor may be evaporated and the boracic acid crystallized out, as is well understood; but it is preferred to add a saturated solution containing about five hundred pounds of crystals of carbonate of soda (or the equivalent quantity of dry carbonate of soda) to the clear liquor and boil it for about an hour. The liquor thus prepared is to be allowed to stand to settle, and the clear liquor is to be drawn off; or the liquor may be filtered. In either case the deposit or residue is to be well washed and the clear liquor obtained added to the other liquor. The fluid or solution thus produced is then to be evaporated till a pellicle forms, when the borax or borate of soda is to be crystallized out in the usual way, and is well understood.

Instead of sulphuric acid being employed to neutralize the alkaline and earthy matters, muriatic acid or oxalic acid may be used in equivalent quantities, and the process conducted as above described; but it is preferred to use sulphuric acid, as above explained.

We do not claim making borax by combining the boracic acid of commerce with a solution of carbonate of soda, and boiling and evaporating the same; but What we do claim is—

Our mode of manufacturing borate of soda from borate of lime, the same consisting in boiling the borate of lime in water and an acid, separating the lime and other foreign matters, adding a saturated solution of soda to the liquid, boiling the compound, separating the impurities or foreign matters therefrom, and subsequently evaporating the clear liquor and crystallizing out the borax therefrom, as specified.

THOMAS BELL.
HENRY SCHOLEFIELD.

Witnesses:
  GEORGE ROWELL,
    *Of Newcastle-on-Tyne, England.*
  MATT. PLUMMER, Jr.,
*Clerk to Matt. Plummer & Co., Newcastle-on-Tyne.*